Patented Jan. 5, 1937

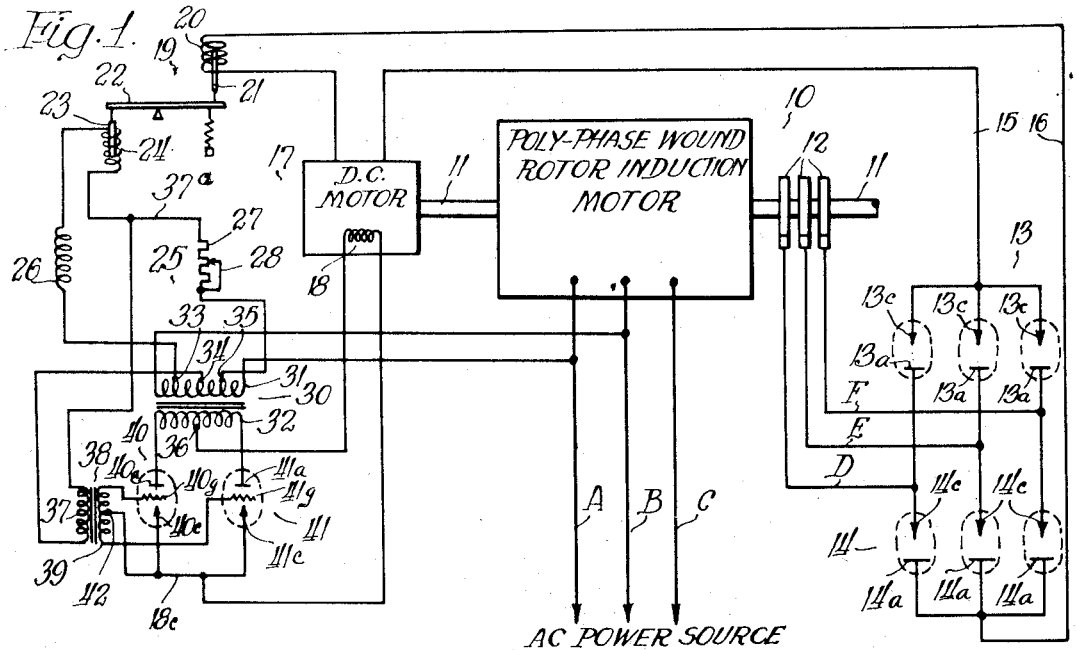
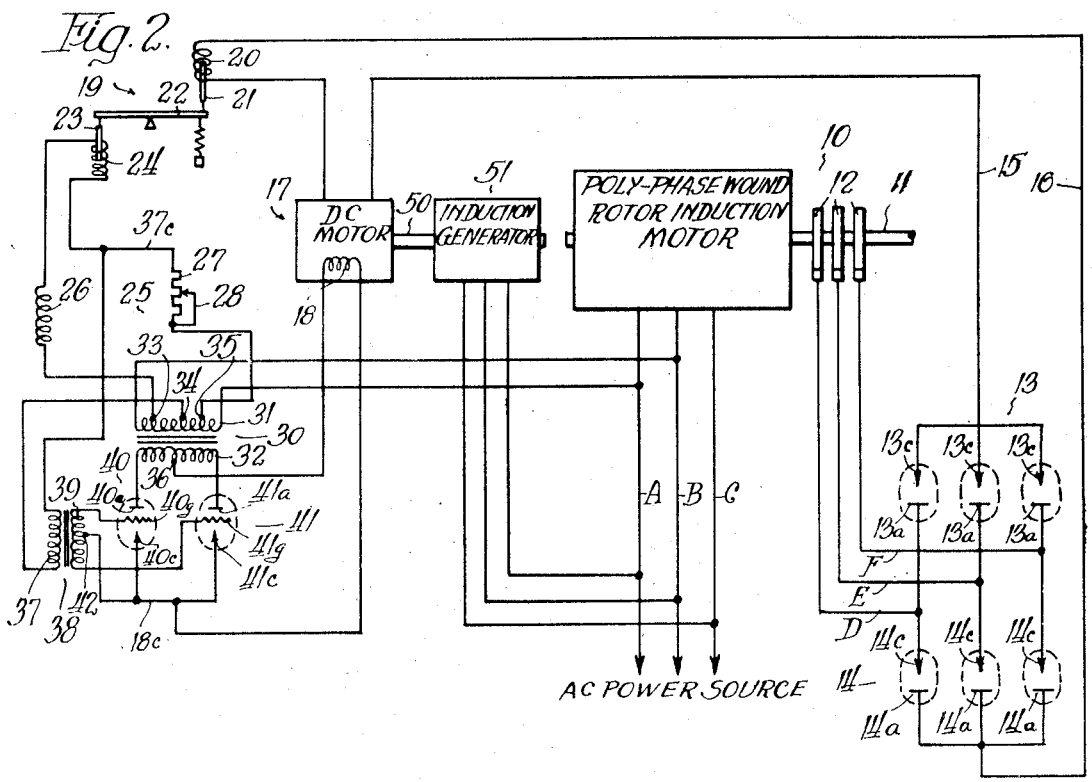

2,066,508

UNITED STATES PATENT OFFICE 2,066,508

ELECTRICAL CONTROL SYSTEM

Hugh E. Young, Chicago, Ill.

Application March 25, 1936, Serial No. 70,758

20 Claims. (Cl. 172—274)

My invention relates generally to electrical control systems and it has particular relation to systems for controlling the speed of a wound rotor induction motor.

Due to the development and widespread use of alternating current power systems, it is desirable to provide an alternating current motor which may be applied in many cases where a direct current motor would otherwise be used because of certain of its inherent speed characteristics. In the past it has been the practice to convert alternating current into direct current and to use a direct current motor where a wide speed range is desired, such as is necessary for rolling mills, machine tool applications, elevator systems and the like. In order to obtain a source of direct current for such applications, it has been the practice to use a motor-generator set or electronic rectifying devices. Such apparatus is, of course, expensive to install and to maintain. For variable speed operation it is desirable, in many instances, to approach the characteristics of a direct current motor, particularly the constant speed characteristic of a shunt motor. This has been difficult with alternating current motor control systems of the prior art.

Many systems have been proposed for operating alternating current motors at variable speeds. According to one of these systems, the effective voltage applied to the stator winding is varied. In another system the number of poles is varied. Still another system is to vary the applied frequency. Probably the system which has gone into most use employs a wound rotor induction motor, with means for varying the effective resistance of the circuit including the wound rotor.

In operating these several systems, many difficulties have been encountered. For example, if the voltage is varied, either a star-delta connection is used, or a transformer is provided for lowering the effective voltage. In either case, however, only a relatively low starting torque is available, and both systems require complicated and expensive switching equipment. The number of poles may be varied by using two motors mounted on the same shaft, or by using two different windings in the motor frame, or by changing the connections to the windings of the motor. In each case, however, the speed changes are limited to distinct steps, and in most cases the motor is not operated under its most efficient operating conditions. When the speed of an induction motor is varied by changing the applied frequency, very expensive equipment is required. Moreover, except at a single frequency, or within a limited range of frequency, the efficiency of the system is very low because of the change of frequency from that for which the motor is especially designed. The control system involving the change of effective resistance in the rotor circuit of a wound rotor induction motor has, as stated hereinbefore, gone into most widespread use. However, this system has the inherent defect that there is considerable loss in efficiency due to the dissipation of slip energy unless particular means are employed for utilizing the slip energy and applying it, either to provide additional operating torque, or to return it to the power source.

The object of my invention, generally stated, is to provide a control system for a wound rotor induction motor which shall be simple and efficient in operation and which may be readily and economically manufactured and installed.

The principal object of my invention is to provide for controlling the speed of a wound rotor induction motor by varying the effective resistance of the rotor circuit.

An important object of my invention is to provide for adjustably controlling the speed of a wound rotor induction motor in such manner that its speed will remain substantially constant, regardless of the load applied thereto.

Another important object of my invention is to provide for transforming the slip energy of a wound rotor induction motor into work, rather than dissipating it in the form of heat energy.

Another object of my invention is to provide for controlling the amount of slip energy of a wound rotor induction motor that is converted into useful work as a function of a variable characteristic of the rotor circuit.

Still another object of my invention is to provide for variably controlling the field excitation of a direct current motor energized by means of the slip energy of a wound rotor induction motor to in turn control the speed of the induction motor.

A further object of my invention is to provide an adjustable phase shifting circuit for controlling the excitation from an electric valve rectifier that is applied to the field winding of a direct current motor which is energized by the slip energy of a wound rotor induction motor for varying the speed thereof.

Still a further object of my invention is to provide for automatically adjusting a phase shifting circuit as a function of the current in the rotor circuit of a wound rotor induction motor to control the excitation applied to the field winding of a direct current motor energized by means of the slip energy of the induction motor to maintain its speed at a substantially constant value regardless of the load applied thereto.

Other objects of my invention will in part be obvious and in part appear hereinafter.

Accordingly, my invention is disclosed in the embodiments hereof shown in the accompanying drawing and comprises the features of construction, combination of elements and arrangement of parts which will be exemplified in the constructions hereinafter set forth and the scope of the application of which will be indicated in the appended claims.

For a more complete understanding of the nature and scope of my invention, reference may be had to the following detail description, taken in connection with the accompanying drawing, in which:

Figure 1 illustrates diagrammatically one modification of my invention; and

Figure 2 illustrates diagrammatically another modification of my invention.

According to one modification of my invention I have provided a constant horsepower system in which a polyphase wound rotor induction motor is arranged to drive a load through a shaft to which is also connected a direct current motor that is arranged to be energized by the slip energy of the induction motor. The slip energy is converted into direct current by means of electric valves interconnected in the circuit between the slip rings of the induction motor and the armature of the direct current motor. In order to control the speed at which the induction motor operates, the direct current motor is provided with a main field winding which is arranged to be energized with direct current obtained from a full wave electric valve rectifying circuit. The amount of direct current supplied to energize the main field winding is controlled by means of a phase shifting circuit which, in turn, is arranged to control the energization of the control electrodes in the valves forming a part of the rectifying circuit. By advancing or retarding the relative time in each half cycle at which the electric valves are rendered conducting, it is possible to correspondingly increase or decrease the amount of direct current supplied for energizing the main field winding of the direct current motor. The phase shifting circuit is made manually and automatically adjustable. The manual means may be adjusted to present the speed of the induction motor at any desired speed. In order to maintain the speed of the induction motor at the desired speed, an automatic regulator is provided which is operable in accordance with the current flowing in the circuit interconnecting the rotor of the induction motor and the direct current motor. When the phase shifting circuit is once adjusted for a predetermined speed, the regulator will maintain the speed of the induction motor at this speed, in applications where a constant horsepower is required.

In another embodiment of the invention I have provided a constant torque system which utilizes the principles of the invention hereinbefore described. Instead of applying the output of the direct current motor to the load driven by the induction motor, the direct current motor is connected to drive a generator such as an induction generator, which is connected to return alternating current power to the alternating current power source. The remainder of the circuit connections is identical with those described in connection with the constant torque application, and functions in the same manner.

Referring now particularly to Figure 1 of the drawing, the reference character 10 designates, generally, a polyphase wound rotor induction motor which is arranged to drive a load (not shown) through a shaft 11. The induction motor 10 may be provided with the usual stator winding and wound rotor winding which are well known to those skilled in the art and therefore will not be shown or described in detail herein. The winding of the rotor may be connected to slip rings 12 which are mounted, as illustrated, on the shaft 11. In order to rectify the alternating current energy applied to the slip rings 12 from the wound rotor, electric valve units, shown generally at 13 and 14, are provided. As shown, each of the valves of the valve unit 13 is provided with a cathode 13c and an anode 13a. It will also be noted that each of the valves of the valve unit 14 is likewise provided with a cathode 14c and an anode 14a. Alternating current for energizing the stator of the induction motor 10 may be supplied from a suitable alternating current power source, as indicated, by means of conductors A, B, and C. The slip rings 12 may be interconnected with the anodes 13a and cathodes 14c of the electric valves 13 and 14, by means of conductors D, E, and F, as illustrated.

The rectified slip energy of the induction motor 10 is applied to conductors 15 and 16 which, as illustrated, are connected to energize the direct current motor 17. As indicated, the direct current motor 17 is operatively connected to the shaft 11 so that the torque developed by it is also applied to rotate the shaft 11. The direct current motor 17 is provided with a main field winding 18, the control of which will be set forth in detail hereinafter.

With a view to automatically controlling the functioning of the system to maintain the speed of the induction motor 10 at a predetermined value, a regulator, shown generally at 19, is provided. The regulator 19 may be constructed in a manner similar to that shown in my co-pending application, Serial No. 618,369, filed June 20, 1932. The regulator 19 is provided with an operating winding 20 which is arranged to cooperate with an armature 21. As shown, the operating winding 20 is connected in series circuit relation with the conductor 16 interconnecting the electric valve unit 14 with the direct current motor 17. The armature 21 is connected to an operating lever 22 which, at the opposite end thereof, has connected thereto an armature 23 disposed to be variably positioned within a winding 24 forming a part of the inductive circuit of a phase shifting circuit, shown generally at 25. An inductor 26 connected in series circuit relation with the winding 24 completes the inductive portion of the phase shifting circuit 25. A potentiometer or variable resistor 27 is also included in the phase shifting circuit 25, having a variable connection 28 for varying the effective resistance thereof.

With a view to energizing the phase shifting circuit 25, and for other purposes which will hereinafter appear, a transformer 30 is provided having a primary winding 31 connected for energization across the main line conductors A and B. It will be observed that the primary winding 31 is provided with taps 33, 34 and 35 and that the phase shifting circuit 25 is connected between the taps 33 and 35. It will also be observed that the secondary winding 32 is provided with a mid-tap 36.

The phase shifted voltage of the phase shifting circuit 25 is applied to the primary winding 37 of a grid transformer, shown generally at 38. It will be observed that one terminal of the primary winding 37 is connected to the common connection 37a between the variable inductor 24 and the potentiometer 27, while the other terminal is connected to the tap 34 on the primary winding 31. The grid transformer 38 is provided with a secondary winding 39 the terminals of which are connected to control electrodes 40g and 41g of rectifying valves, shown generally at 40 and 41, respectively. The rectifying valves 40 and 41 are provided, respectively, with anodes 40a and 41a and cathodes 40c and 41c. The anodes 40a and 41a are connected to the terminals of the secondary winding 32, while the cathodes 40c and 41c are connected to a common conductor 18c and to the main field winding 18 of the direct current motor 17, the other terminal of the field winding 18 being connected to the mid-tap 36 on the secondary winding 32. It will be observed that the secondary winding 39 is provided with a mid-tap 42 which is connected to the common conductor 18c in order to provide the proper potential on the control electrodes 40g and 41g with respect to the corresponding cathodes 40c and 41c.

In operation, the potentiometer 27 is adjusted by sliding the variable connection 28 therealong until the setting is obtained corresponding to the desired speed of the motor 10. The main line conductors A, B and C may then be connected to energize the induction motor 10. Current will flow through the operating winding 20 in an amount proportional to the slip energy, and, as a result, the direct current motor 17 will be correspondingly energized. In response to the current flowing through the operating winding 20 the regulator 19 and apparatus associated therewith tends to maintain the slip current at a substantially constant value. This is effected by moving the armature 23 in and out of the winding 24 to correspondingly vary the effective inductance thereof. As a result, the time in each half-cycle at which the control electrodes 40g and 41g are energized, is changed to either increase or decrease the effective amount of current flowing through the main field winding 18 of the direct current motor 17. In the event that the speed of the induction motor is too high, there will be a corresponding decrease in the slip energy, and as a result the current flowing through the winding 20 will be decreased. This will affect the regulator 19 in such manner that the voltage applied to the primary winding 37 of the grid transformer 38 will be advanced in phase relation relative to the voltage which is applied across the secondary winding 32 of the transformer 30, and as a result, the control electrodes 40g and 41g will be energized at an earlier time in each half cycle during which the rectifying valves 40 and 41 are adapted to become conducting. The flow of current through the main field winding 18 will be increased, with a resulting increase in the counter electromotive force generated in the armature of the direct current motor 17. The effect of the increased counter electromotive force is similar to increasing the effective resistance in the rotor circuit, and as a result the slip current decreases and the motor slows down.

Referring now particularly to Figure 2 of the drawing, it will be observed that the direct current motor 17 is arranged to drive a shaft 50 on which may be mounted a generator 51 of the induction type. While a generator 51 of the induction type has been illustrated, it will be understood that a generator of the synchronous type may also be used. The induction generator 51 is connected, as illustrated, to return power to the alternating current power source through connections to the main line conductors A, B, and C. When the energy of the direct current motor 17 is returned to the alternating current power system rather than to the load driven by the induction motor, a constant torque system results, rather than a constant horsepower system. Since the remaining circuit details and sequence of operation for the constant torque system shown in Figure 2 are identical with those set forth hereinbefore in connection with Figure 1, they will not be repeated.

Since certain further changes may be made in the foregoing constructions, and different embodiments of the invention may be made without departing from the scope thereof, it is intended that all matter shown in the accompanying drawing or set forth in the foregoing description shall be interpreted as illustrative, and not in a limiting sense.

I claim:

1. An electrical control system for a wound rotor induction motor comprising. in combination, a direct current motor, means associated with said direct current motor for utilizing the output thereof, circuit means interconnecting the rotor of said induction motor and said direct current motor, rectifying means interposed in said circuit means in such manner as to cause the flow of direct current therein, a field winding in said direct current motor, and means for variably exciting said field winding in accordance with the current flowing in said circuit means.

2. An electrical control system for a wound rotor induction motor comprising, in combination, a direct current motor, means associated with said direct current motor for utilizing the output thereof, circuit means interconnecting the rotor of said induction motor and said direct current motor, electric valve means interposed in said circuit means in such manner as to cause the flow therethrough of direct current, a field winding in said direct current motor, and means for variably exciting said field winding.

3. An electrical control system for a wound rotor induction motor comprising. in combination. a direct current motor, means associated with said direct current motor for utilizing the output thereof, circuit means interconnecting the rotor of said induction motor and said direct current motor, rectifying means interposed in said circuit means in such manner as to cause the flow of direct current therein, a field winding in said direct current motor, electric valve rectifying means connected to effect the energization of said field winding, and means for varying the conductivity of said valve means for variably exciting said field winding.

4. An electrical control system for a wound rotor induction motor comprising, in combination, a direct current motor, means associated with said direct current motor for utilizing the output thereof, circuit means interconnecting the rotor of said induction motor and said direct current motor, rectifying means interposed in said circuit means in such manner as to cause the flow of direct current therein, a field winding in said direct current motor, electric valve rectifying means connected to effect the energization of said field winding, control electrode means in said valve means, phase shift means connected to control the energization of said electrode means, and means for adjusting said phase shift means to advance or retard the time when said electrode means is energized, thereby controlling the excitation of said field winding.

5. An electrical control system for a wound rotor induction motor comprising, in combination, a direct current motor, means associated with said direct current motor for utilizing the output thereof, circuit means interconnecting the rotor of said induction motor and said direct current motor, electric valve means interposed in said circuit means in such manner as to cause the flow therethrough of direct current, a field winding in said direct current motor, and means operable in accordance with a variable characteristic of said circuit means for variably exciting said field winding.

6. An electrical control system for a wound rotor induction motor comprising, in combination, a direct current motor, means associated with said direct current motor for utilizing the output thereof, circuit means interconnecting the rotor of said induction motor and said direct current motor, rectifying means interposed in said circuit means in such manner as to cause the flow of direct current therein, a field winding in said direct current motor, electric valve rectifying means connected to effect the energization of said field winding, and means operable in accordance with a variable characteristic of said circuit means for varying the conductivity of said valve means to variably excite said field winding.

7. An electrical control system for a wound rotor induction motor comprising, in combination, a direct current motor, means associated with said direct current motor for utilizing the output thereof, circuit means interconnecting the rotor of said induction motor and said direct current motor, rectifying means interposed in said circuit means in such manner as to cause the flow of direct current therein, a field winding in said direct current motor, electric valve rectifying means connected to effect the energization of said field winding, control electrode means in said valve means, phase shift means connected to control the energization of said electrode means, and regulating means operable in accordance with a variable characteristic of said circuit means for adjusting said phase shift means to advance or retard the time when said electrode means is energized, whereby the excitation of said field winding is varied.

8. An electrical control system for a wound rotor induction motor disposed to drive a load through a shaft comprising, in combination, a direct current motor having driving connection with said shaft, circuit means interconnecting the rotor of said induction motor and said direct current motor, rectifying means interposed in said circuit means in such manner as to cause the flow of direct current, a field winding in said direct current motor, and means for variably exciting said field winding in accordance with the current flowing in said circuit means.

9. An electrical control system for a wound rotor induction motor disposed to drive a load through a shaft comprising, in combination, a direct current motor having driving connection with said shaft, circuit means interconnecting the rotor of said induction motor and said direct current motor, electric valve means interposed in said circuit means in such manner as to cause the flow of direct current, a field winding in said direct current motor, and means for variably exciting said field winding.

10. An electrical control system for a wound rotor induction motor disposed to drive a load through a shaft comprising, in combination, a direct current motor having driving connection with said shaft, circuit means interconnecting the rotor of said induction motor and said direct current motor, rectifying means interposed in said circuit means in such manner as to cause the flow of direct current, a field winding in said direct current motor, electric valve rectifying means connected to effect the energization of said field winding, and means for varying the conductivity of said valve means for variably exciting said field winding.

11. An electrical control system for a wound rotor induction motor disposed to drive a load through a shaft comprising, in combination, a direct current motor having driving connection with said shaft, circuit means interconnecting the rotor of said induction motor and said direct current motor, rectifying means interposed in said circuit means in such manner as to cause the flow of direct current, a field winding in said direct current motor, electric valve rectifying means connected to effect the energization of said field winding, control electrode means in said valve means, phase shift means connected to control the energization of said electrode means, and means for adjusting said phase shift means to advance or retard the time when said electrode means is energized, thereby controlling the excitation of said field winding.

12. An electrical control system for a wound rotor induction motor disposed to drive a load through a shaft comprising, in combination, a direct current motor having driving connection with said shaft, circuit means interconnecting the rotor of said induction motor and said direct current motor, electric valve means interposed in said circuit means in such manner as to cause the flow of direct current, a field winding in said direct current motor, and means operable in accordance with a variable characteristic of said circuit means for variably exciting said field winding.

13. An electrical control system for a wound rotor induction motor disposed to drive a load through a shaft comprising, in combination, a direct current motor having driving connection with said shaft, circuit means interconnecting the rotor of said induction motor and said direct current motor, rectifying means interposed in said circuit means in such manner as to cause the flow of direct current, a field winding in said direct current motor, electric valve rectifying means connected to effect the energization of said field winding, and means operable in accordance with a variable characteristic of said circuit means for varying the conductivity of said valve means to variably excite said field winding.

14. An electrical control system for a wound rotor induction motor disposed to drive a load through a shaft comprising, in combination, a direct current motor having driving connection with said shaft, circuit means interconnecting the rotor of said induction motor and said direct current motor, rectifying means interposed in said circuit means in such manner as to cause the flow of direct current, a field winding in said direct current motor, electric valve rectifying means connected to effect the energization of said field winding, control electrode means in said valve means, phase shift means connected to control the energization of said electrode means, and regulating means operable in accordance with a variable characteristic of said circuit means for adjusting said phase shift means to advance or retard the time when said electrode means is energized, whereby the excitation of said field winding is varied.

15. An electrical control system for a wound rotor induction motor comprising, in combination, circuit means for connecting said induction motor to an alternating current source, an alternating current generator electrically connected to said current source, a direct current motor having driving connection with said generator, circuit means interconnecting the rotor of said induction motor and said direct current motor, rectifying means interposed in said circuit means in such manner as to cause the flow of direct current, a field winding in said direct current motor, and means for variably exciting said field winding in accordance with the current flowing in said circuit means.

16. An electrical control system for a wound rotor induction motor comprising, in combination, circuit means for connecting said induction motor to an alternating current source, an alternating current generator electrically connected to said current source, a direct current motor having driving connection with said generator, circuit means interconnecting the rotor of said induction motor and said direct current motor, electric valve means interposed in said circuit means in such manner as to cause the flow of direct current, a field winding in said direct current motor, and means for variably exciting said field winding.

17. An electrical control system for a wound rotor induction motor comprising, in combination, circuit means for connecting said induction motor to an alternating current source, an alternating current generator electrically connected to said current source, a direct current motor having driving connection with said generator, circuit means interconnecting the rotor of said induction motor and said direct current motor, rectifying means interposed in said circuit means in such manner as to cause the flow of direct current, a field winding in said direct current motor, electric valve rectifying means connected to effect the energization of said field winding, and means for varying the conductivity of said valve means for variably exciting said field winding.

18. An electrical control system for a wound rotor induction motor comprising, in combination, circuit means for connecting said induction motor to an alternating current source, an alternating current generator electrically connected to said current source, a direct current motor having driving connection with said generator, circuit means interconnecting the rotor of said induction motor and said direct current motor, rectifying means interposed in said circuit means in such manner as to cause the flow of direct current, a field winding in said direct current motor, electric valve rectifying means connected to effect the energization of said field winding, control electrode means in said valve means, phase shift means connected to control the energization of said electrode means, and means for adjusting said phase shift means to advance or retard the time when said electrode means is energized, thereby controlling the excitation of said field winding.

19. An electrical control system for a wound rotor induction motor comprising, in combination, circuit means for connecting said induction motor to an alternating current source, an alternating current generator electrically connected to said current source, a direct current motor having driving connection with said generator, circuit means interconnecting the rotor of said induction motor and said direct current motor, electric valve means interposed in said circuit means in such manner as to cause the flow therethrough of direct current, a field winding in said direct current motor, and means operable in accordance with a variable characteristic of said circuit means for variably exciting said field winding.

20. An electrical control system for a wound rotor induction motor comprising, in combination, circuit means for connecting said induction motor to an alternating current source, an alternating current generator electrically connected to said current source, a direct current motor having driving connection with said generator, circuit means interconnecting the rotor of said induction motor and said direct current motor, rectifying means interposed in said circuit means in such manner as to cause the flow of direct current, a field winding in said direct current motor, electric valve rectifying means connected to effect the energization of said field winding, control electrode means in said valve means, phase shift means connected to control the energization of said electrode means, and regulating means operable in accordance with a variable characteristic of said circuit means for adjusting said phase shift means to advance or retard the time when said electrode means is energized, whereby the excitation of said field winding is varied.

HUGH E. YOUNG.